(12) United States Patent
Henshaw et al.

(10) Patent No.: US 6,459,717 B1
(45) Date of Patent: Oct. 1, 2002

(54) CONTINUOUS WAVE ALL GAS PHASE IODINE LASER (AGIL)

(75) Inventors: Thomas L. Henshaw, Albuquerque, NM (US); Gordon D. Hager, Rio Rancho, NM (US); Michael R. Berman, Springfield, VA (US); Timothy J. Madden, Albuquerque, NM (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 249 days.

(21) Appl. No.: 09/615,206

(22) Filed: Jul. 13, 2000

(51) Int. Cl.[7] .............................. H01S 3/95
(52) U.S. Cl. ....................... 372/58; 372/55; 372/89
(58) Field of Search .................... 372/89, 55

(56) References Cited

U.S. PATENT DOCUMENTS 4,961,200 A * 10/1990 Verdier et al. ............. 372/89
5,093,836 A * 3/1992 Gole et al. ................. 372/56
6,154,478 A * 11/2000 Vetrovec .................... 372/89

OTHER PUBLICATIONS

W. E. McDermott, et al., Appl. Phys. Lett. 32, 469, (1978).

D. J. Bernard, et al., Appl. Phys. Lett. 34, 40 (1979).

* cited by examiner

Primary Examiner—Paul Ip
Assistant Examiner—Leith Al-Nazer
(74) Attorney, Agent, or Firm—James M. Skorich; Kenneth E. Callahan

(57) ABSTRACT

An all gas phase iodine cw laser operating on the electronic $I(^2P_{3/2})-I^*(^2P_{1/2})$ transition of atomic iodine at 1.315 $\mu$m was described. The laser is based on the energy transfer reaction between metastable $NCl(a^1\Delta)$ and ground state $I(^2P_{3/2})$ atoms. This all gas phase laser has a number of advantages over previous aqueous-based chemical oxygen iodine lasers, including lighter weight, zero-gravity operation, and heat rejection in the exhaust.

9 Claims, 3 Drawing Sheets

Flow Reactor and Resonator Conditions for Achieving Laser Action on the I* ($^2P_{1/2}$) - I ($^2P_{3/2}$) Transition

| | Flow Reactor Conditions | | | | | | | Resonator Conditions | | |
|---|---|---|---|---|---|---|---|---|---|---|
| Trial | He | NF3 | DCl | HN3 | HI | P (torr) | Zone (cm) | HR | OC | Power (mW) |
| | (mmol/s) | | | | | | | | | |
| 1 | 128.80 | 1.08 | 2.11 | 3.16 | 0.04 | 15.73 | 15 | 0.99998 | 0.99998 | 6 |
| 2 | 127.86 | 1.02 | 2.20 | 3.03 | 0.04 | 15.61 | 15 | 0.99998 | 0.9988 (I) | 19 |
| 3 | 149.78 | 1.53 | 2.22 | 4.36 | 0.07 | 14.67 | 15 | 0.99998 | 0.9988 (I) | 110 |
| 4 | 141.73 | 1.51 | 2.40 | 4.59 | 0.07 | 14.95 | 15 | 0.99998 | 0.9988 (II) | 180 |

FIG. 3

CONTINUOUS WAVE ALL GAS PHASE IODINE LASER (AGIL)

STATEMENT OF GOVERNMENT INTEREST

The conditions under which this invention was made are such as to entitle the Government of the United States under paragraph 1(a) of Executive Order 10096, as represented by the Secretary of the Air Force, to the entire right, title and interest therein, including foreign rights.

BACKGROUND OF THE INVENTION

1. Field of the Invention

The present invention is in the field of chemical lasers, and in particular relates to a gas-phase iodine laser.

2. Description of the Prior Art

Chemical lasers are devices that derive their population inversions from exothermic chemical reactions, whether directly or indirectly, and include photochemical-induced bond dissociation, radiative recombination of atoms or molecules, and energy transfer processes. In view of their generally efficient conversion of chemical potential into laser radiation, chemical lasers have been sought after for numerous applications in which lightweight, self-contained lasers are utilized.

In 1978 McDermott and co-workers demonstrated the first chemically-pumped electronic transition laser (W. E. McDermott, et al., Appl. Phys. Lett. 32, 469, (1978) and D. J. Bernard, et al., Appl. Phys. Lett. 34, 40 (1979).) Continuous wave (cw) laser oscillation was achieved on the $I^*(^2P_{1/2})-I(^2P_{3/2})$ transition via the energy transfer reaction between the oxygen metastable, $O_2(a^1\Delta)$, and a ground state iodine atom, $I(^2P_{3/2})$. This chemistry forms the basis of the high-powered Chemical Oxygen Iodine Laser (COIL), which operates in the near infrared at 1.315-$\mu$m with cw power of up to 40 kW.

The current method for generating chemically pumped, continuous wave iodine lasing at 1.315 $\mu$m requires a heterogeneous mixture of chlorine gas and an aqueous peroxide-based solution to generate the $I^*(^2P_{1/2})$ lasant species. The COIL, the laser currently deployed in the Airborne Laser (ABL), uses this chemistry to generate atomic iodine lasing at 1.315 $\mu$m. It is based on the following chemical mechanism,

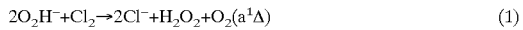  (1)

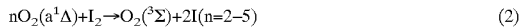  (2)

  (3)

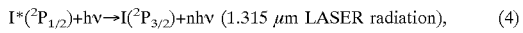  (4)

The principal limitations of this device are derived from the aqueous ($H_2O$ based) chemistry and include the following system disadvantages: the aqueous peroxide solution is heavy and reduces device efficiency; water ($H_2O$) quenches or destroys the $I^*(^2P_{1/2})$ lasant material; aqueous chemistry is inefficient in zero gravity environments; and heat from chemical reactions is retained in basic hydrogen peroxide mixture.

As such, to make the COIL laser viable and robust in all environments (ground, air and space), extensive engineering is required to accommodate the aqueous chemistry. One approach to mitigate these drawbacks is to design an all gas phase laser system that eliminates the waterbased chemistry, the subject of the present invention.

SUMMARY OF THE INVENTION

The continuous wave All Gas Phase Iodine Laser (AGIL), is based on a chemical energy transfer reaction between gas phase metastable $NCl(a^1\Delta)$ molecules and ground state $I(^2P_{3/2})$ atoms. The $NCl(a^1\Delta)$ molecule transfers its electronic energy to a ground state $I(^2P_{3/2})$ atom with resultant continuous wave (cw) laser action on the electronic $I^*(^2P_{1/2})-I(^2P_{3/2})$ transition of atomic iodine at 1.315 $\mu$m. The invention uses the gas phase chemicals He (Helium), $NF_3$ (Nitrogen trifluoride), DCl (Deuterium chloride), HI (Hydrogen iodide) and $HN_3$ (Hydrogen azide) of suitable substitutes.

BRIEF DESCRIPTION OF THE DRAWINGS

The various features of novelty that characterize the invention are pointed out with particularity in the claims annexed to and forming a part of this disclosure. For a better understanding of the invention, its operating advantages, and specific objects attained by its uses, reference is made to the accompanying drawings and descriptive matter in which a preferred embodiment of the invention is illustrated.

FIG. 3 contains a table of various flow reactor conditions and optical resonator conditions used experimentally to demonstrate lasing.

DESCRIPTION OF THE PREFERRED EMBODIMENTS

The AGIL is a device in which the energy required for laser operation is achieved through the transformation of the solely gas phase chemical reagents, $NF_3$ (nitrogen trifluoride), DCl(deuterium chloride) HI (hydrogen iodide) and $HN_3$ (hydrogen azide) into $I^*(^2P_{1/2})$ laser radiation at 1.315 $\mu$m. Helium is also used, however, its role is limited to a buffer or carrier gas for these reagents. The chemical generation of $I^*(^2P_{1/2})$ lasing is based on a sequential process in which Cl and I atoms are produced,

  (5)

  (6)

followed by $NCl(a^1\Delta)$ production,

  (7)

  (8)

and finally the energy transfer reaction between $NCl(a^1\Delta)$ and $I(^2P_{3/2})$ to generate $I^*(^2P_{1/2})$:

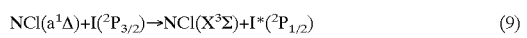  (9)

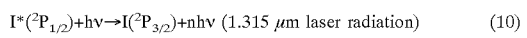  (10)

Figure 1:
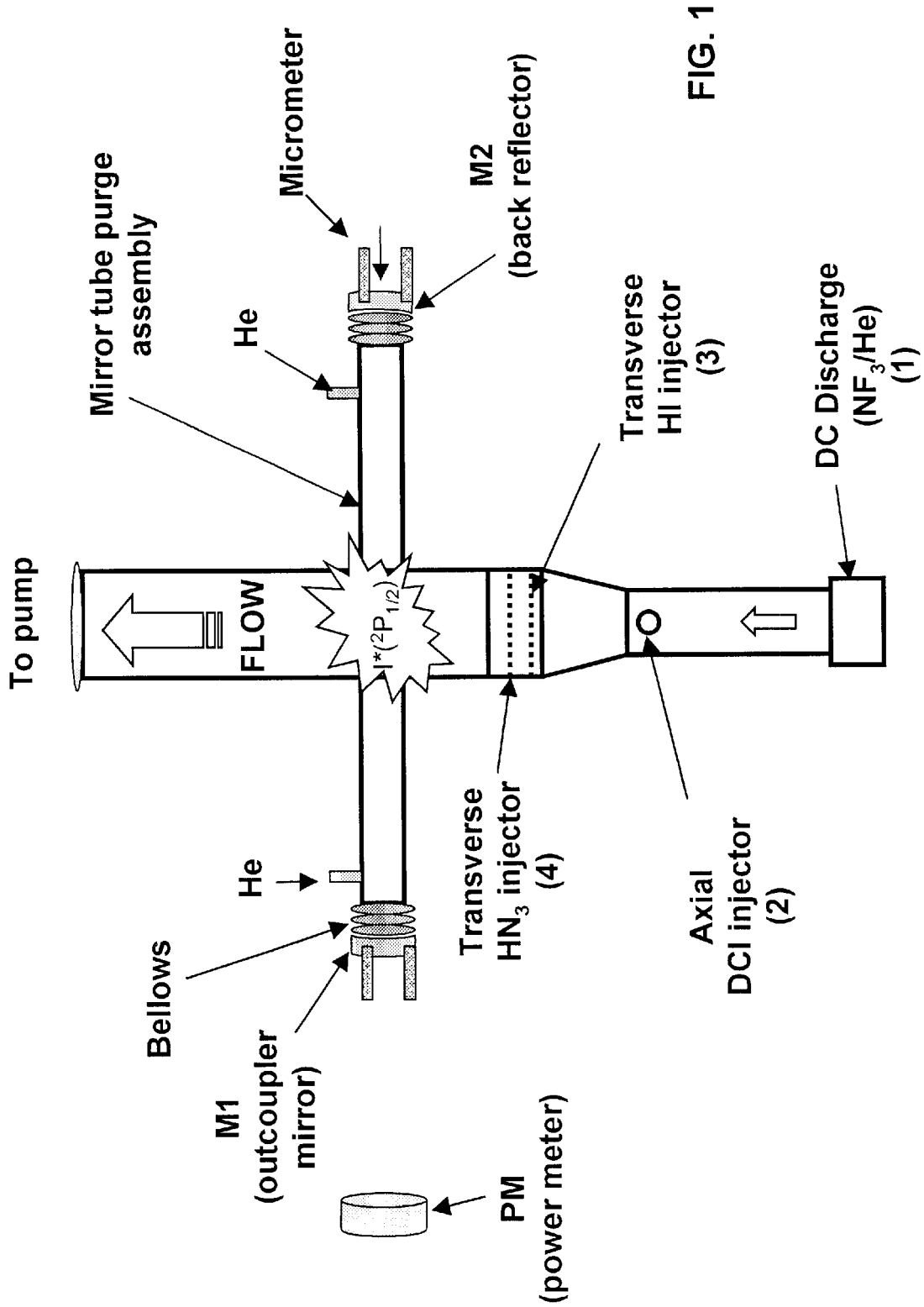
FIG. 1 is a diagram of the transverse subsonic flow reactor and optical resonator apparatus used to demonstrate the AGIL.

The demonstration of $I^*(^2P_{1/2})-I(^2P_{3/2})$ laser action using this mode and chemistry was performed in a transverse subsonic flow reactor shown in FIG. 1. The essential features of this apparatus include a device for fluorine (F) atom production. The device can be an electrical discharge (DC), RF or microwave radiation, or chemical combustion. As shown in FIG. 1, fluorine atoms were generated using a 10 kW DC discharge of $NF_3$ in helium. The pressure in the system was regulated by flowing $N_2$ 1.5 meters downstream of the reactor cavity through a 3-cm choke orifice. Downstream of the fluorine atom injection point were nozzles or injectors for the insertion of DCl, HI and $HN_3$ into the flow stream. The flow stream can be either subsonic or supersonic. The gaseous $HN_3$ was stored as a 10% mixture of helium. Helium diluent (Matheson, 99.995%), $F_2$ (Matheson, 20% in He), $NF_3$ (Spectra Gas, 99%), DCl (Cambridge Isotopes, 99%), and HI (Matheson, 99%) were used without further purification.

Figure 2:
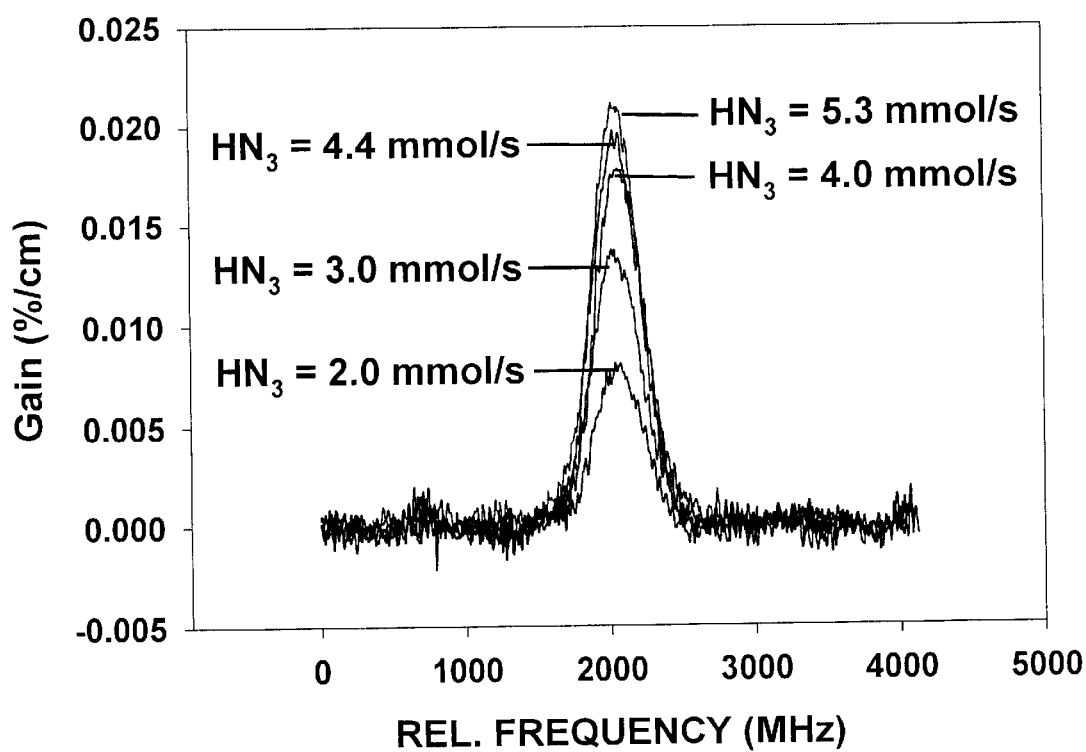
FIG. 2 is a summary of the $I^*(^2P_{1/2})-I(^2P_{3/2})$ gain measured experimentally with respect to various $HN_3$ flows.

A laser resonator comprised of mirror tubes or boxes, He purges, mirror mounts, bellows and optical cavity mirrors. FIG. 2 is a summary of the $I^*(^2P_{1/2})-I(^2P_{3/2})$ gain measured experimentally with respect to various $HN_3$ flows ranging from 2.0 to 5.3 mmol/s for fixed flows of $NF_3$=2.4 mmol/s, DCl=2.0 mmol/s and HI=0.07 mmol/s and a total pressure of 16 torr. The data was collected 7 cm downstream from the $HN_3$ injection The gain measured in FIG. 2 represents the necessary but not sufficient condition for laser oscillation. The conditions under which laser action will occur depend on the mirror reflectances. There is a range of mirror reflectivities (R) over which power can be extracted and an optimum reflectivity that determines the maximum output power. For the AGIL apparatus used to demonstrate lasing, output couplers within the range 0.99998>R>0.9979 were employed to examine their effect on extracting higher laser power.

The high finesse optical cavity used consisted of two symmetric mirrors (M1 and M2 in FIG. 1) with 0.99998 reflectivity at 1.32 $\mu$m and 5-m radius of curvature. The flow reactor and resonator conditions for demonstrating lasing are tabulated in the table of FIG. 3. Four trials were made using various flow reactor conditions and, in trial 1, a different output coupler (OC). The maximum power output obtained for these trials was 180 mW.

The AGIL device replaces the aqueous peroxide-based COIL with a gas phase generation of $NCl(a^1\Delta)$, an isovalent analog of the $O_2(a^1\Delta)$ energy carrier in COIL, while preserving the single line laser emission of iodine at 1.315 $\mu$m. As such, there are a number of advantages of the AGIL over other iodine lasers. Since AGIL is a purely gas phase reaction, the heat generated is rejected in the exhaust. It is operational in a zero gravity environment. Being a short wavelength I* laser operating at 1.315 microns gives rise to increased brightness and improved beam control over other gas phase laser systems such as HF/DF. It is a single line laser thus enabling phased aperture operation and alleviating large telescope launch problems. Due to its gas phase composition, the AGIL weight could be nearly a factor of two smaller than the analogous COIL. AGIL also exhibits an extended gain zone, which enables flexible linear or cylindrical resonator design. At 1.315 $\mu$m, the laser exhibits good atmospheric and fiber optic transmission and thus makes possible a wide assortment of missions in both government and industry.

There exist a number of alternative fuels and schemes for the AGIL laser. Deuterium azide ($DN_3$) could be substituted for hydrogen azide ($HN_3$). In addition, deuterium iodide (DI) could be substituted for hydrogen iodide (HI), fluorine ($F_2$) for nitrogen trifluoride ($NF_3$), and nitrogen trichloride ($NCl_3$) for hydrogen or deuterium azide ($HN_3/DN_3$). Alternative methods for generating fluorine atoms other than DC discharges may be used. These include chemical combustors using $F_2/NO$, $F_2/D_2$, or $NF_3/D_2$ chemistry to generate F (fluorine) atoms.

Alternative reaction modes for generating all gas phase $I^*(^2P_{1/2})$ lasing are also indicated and include the following mechanisms:

A. F+DCl→DF+Cl,

F+DI→DF+I

F+DN$_3$→DCl+N$_3$

Cl+N$_3$→NCl($a^1\Delta$)+N$_2$($X^1\Sigma$)

NCl($a^1\Delta$)+I→I*($^2P_{1/2}$)+NCl($X^3\Sigma$)

I*($^2P_{1/2}$)+h$\nu$→I($^2P_{3/2}$)+nh$\nu$ (1.315 $\mu$m laser radiation)

B. D+HI→DH+I

D+NCl$_3$→NCl$_2$+DCl

D+NCl$_2$→DCl+NCl($a^1\Delta$)

NCl($a^1\Delta$)+I→I*($^2P_{1/2}$)+NCl($X^3\Sigma$)

I*($^2P_{1/2}$)+h$\nu$→I($^2P_{3/2}$)+nh$\nu$ (1.315 $\mu$m laser radiation)

C. Any of the above mentioned mechanisms in which $NCl(a^1\Delta)$ and iodine (I) atoms are generated is followed by injection of oxygen, $O_2$, into the flow stream:

NCl($a^1\Delta$)+O$_2$→O$_2$($a^1\Delta$)+NCl($X^3\Sigma$)

O$_2$($a^1\Delta$)+I→I*+O$_2$($X^3\Sigma$)

I*($^2P_{1/2}$)+h$\nu$→I($^2P_{3/2}$)+nh$\nu$ (1.315 $\mu$m laser radiation).

We claim:

1. A continuous wave all gas phase iodine laser comprised of
   a. a subsonic flow device having gas flow from an upstream section to a downstream section;
   b. a source of fluorine gas injected into the upstream section of said flow device;
   c. a source of deuterium chloride (DCl) gas injected downstream of said fluorine gas;
   d. a source of hydrogen iodide (HI) gas injected downstream of said DCl;
   e. a source of hydrogen azide ($HN_3$) gas injected downstream of said HI gas; and
   f. an optical resonator intersecting said flow device downstream of said $HN_3$ gas, whereby the transformation of the fluorine, DCl, HI, and $HN_3$ gas phase chemical reagents generates 1.315 $\mu$m laser radiation within said optical resonator.

2. The gas phase iodine laser of claim 1, wherein the source of fluorine gas is a DC discharge into a nitrogen trifluoride/helium mixture.

3. The gas phase iodine laser of claim 1, wherein deuterium azide ($DN_3$) gas is substituted for $HN_3$ gas.

4. The gas phase iodine laser of claim 1, wherein deuterium iodide (DI) gas is substituted for HI gas.

5. The gas phase iodine laser of claim 1, wherein nitrogen trichloride ($NCl_3$) gas is substituted for $HN_3$ gas.

6. A method for generating a continuous wave laser on the electronic $I^*(^2P_{1/2})$–$I(^2P_{3/2})$ transition of atomic iodine at 1.315 $\mu$m from the $NCl(a^1\Delta)+I(^2P_{3/2})$ energy transfer reaction using a transverse subsonic flow device and an intersecting optical resonator, the method comprising:

a. injecting fluorine atoms into the flow stream;

b. injecting DCl gas into the flow stream downstream of the fluorine atom injection point;

c. injecting HI gas and $HN_3$ gas downstream of the DCl injection point; and d. extracting the electronic transition of atomic iodine at 1.315 $\mu$m downstream of said HI and $HN_3$ injection point using the intersecting optical resonator.

7. The method of iodine laser generation of claim 6, wherein deuterium azide ($DN_3$) gas is substituted for $HN_3$ gas.

8. The method of iodine laser generation of claim 6, wherein nitrogen trichloride ($NCl_3$) gas is substituted for $HN_3$ gas.

9. The method of iodine laser generation of claim 6, wherein deuterium iodide (DI) gas is substituted for HI gas.

* * * * *